United States Patent
Ikegami

(10) Patent No.: US 8,995,017 B2
(45) Date of Patent: Mar. 31, 2015

(54) IMAGE PROCESSING APPARATUS AND RECORDING APPARATUS

(71) Applicant: Canon Kabushiki Kaisha, Tokyo (JP)

(72) Inventor: Shinsuke Ikegami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/906,225

(22) Filed: May 30, 2013

(65) Prior Publication Data

US 2013/0258370 A1    Oct. 3, 2013

Related U.S. Application Data

(63) Continuation of application No. 12/958,226, filed on Dec. 1, 2010, now Pat. No. 8,477,375.

(30) Foreign Application Priority Data

Jun. 16, 2010 (JP) ................................. 2010-137475

(51) Int. Cl.
*G06F 15/00* (2006.01)
*G06K 15/02* (2006.01)
*H04N 1/407* (2006.01)
*H04N 1/387* (2006.01)
*H04N 1/32* (2006.01)

(52) U.S. Cl.
CPC ............ *G06K 15/1898* (2013.01); *H04N 1/407* (2013.01); *H04N 1/3877* (2013.01); *H04N 1/3247* (2013.01)
USPC .......................................... 358/1.9; 358/474

(58) Field of Classification Search
None
See application file for complete search history.

(56) References Cited

U.S. PATENT DOCUMENTS

| | | | |
|---|---|---|---|
| 2001/0002134 A1* | 5/2001 | Minowa et al. | 347/35 |
| 2005/0088539 A1* | 4/2005 | Nakazono et al. | 348/231.3 |
| 2009/0002777 A1* | 1/2009 | Hirosawa et al. | 358/474 |
| 2009/0213429 A1* | 8/2009 | Miyagi | 358/2.1 |
| 2009/0245821 A1* | 10/2009 | Zaima | 399/30 |
| 2009/0317004 A1* | 12/2009 | Ichimura | 382/232 |
| 2010/0245514 A1* | 9/2010 | Kaimoto et al. | 347/104 |
| 2010/0254617 A1* | 10/2010 | Hwang et al. | 382/232 |
| 2011/0074861 A1* | 3/2011 | Saettel et al. | 347/19 |

OTHER PUBLICATIONS

Wikipedia Contributors. "Scanning." Wikipedia, Japanese version of Wikipedia from http://ja.wikipedia.org/wiki/%E8%B5%B0%E6%9F%BB.

* cited by examiner

*Primary Examiner* — Vincent Rudolph
*Assistant Examiner* — Helen Q Zong
(74) *Attorney, Agent, or Firm* — Canon USA, Inc., IP Division

(57) ABSTRACT

Correction processing on image data is performed in a short time. An image processing apparatus supplies image data to a recording apparatus configured to convey a recording medium in a direction intersecting a direction in which recording elements are arranged. The image processing apparatus includes: tables containing correction information for each group into which the recording elements are divided, the correction information being used to correct values of multi-valued data; a horizontal/vertical conversion unit configured to convert multi-valued data in raster format into column format; a correction unit configured to correct multi-valued data belonging to a group by using correction information stored in a table corresponding to that group; a vertical/horizontal conversion unit configured to convert the multi-valued data in column form into raster format; and an output unit configured to output the data in raster format converted by the vertical/horizontal conversion unit to the recording apparatus.

24 Claims, 13 Drawing Sheets

FIG. 2B

|  | REGION 2 | | REGION 3 | | REGION 4 | |
|---|---|---|---|---|---|---|
| N-TH RASTER | 3 | 3 | 1 | 7 | 2 | 1 |
| (N+1)-TH RASTER | 2 | 1 | 3 | 6 | 5 | 4 |
| (N+2)-TH RASTER | 7 | 6 | 5 | 4 | 3 | 2 |
| (N+3)-TH RASTER | 7 | 6 | 5 | 4 | 3 | 2 |
| | COLUMN 1 | COLUMN 2 | COLUMN 3 | COLUMN 4 | COLUMN 5 | COLUMN 6 |

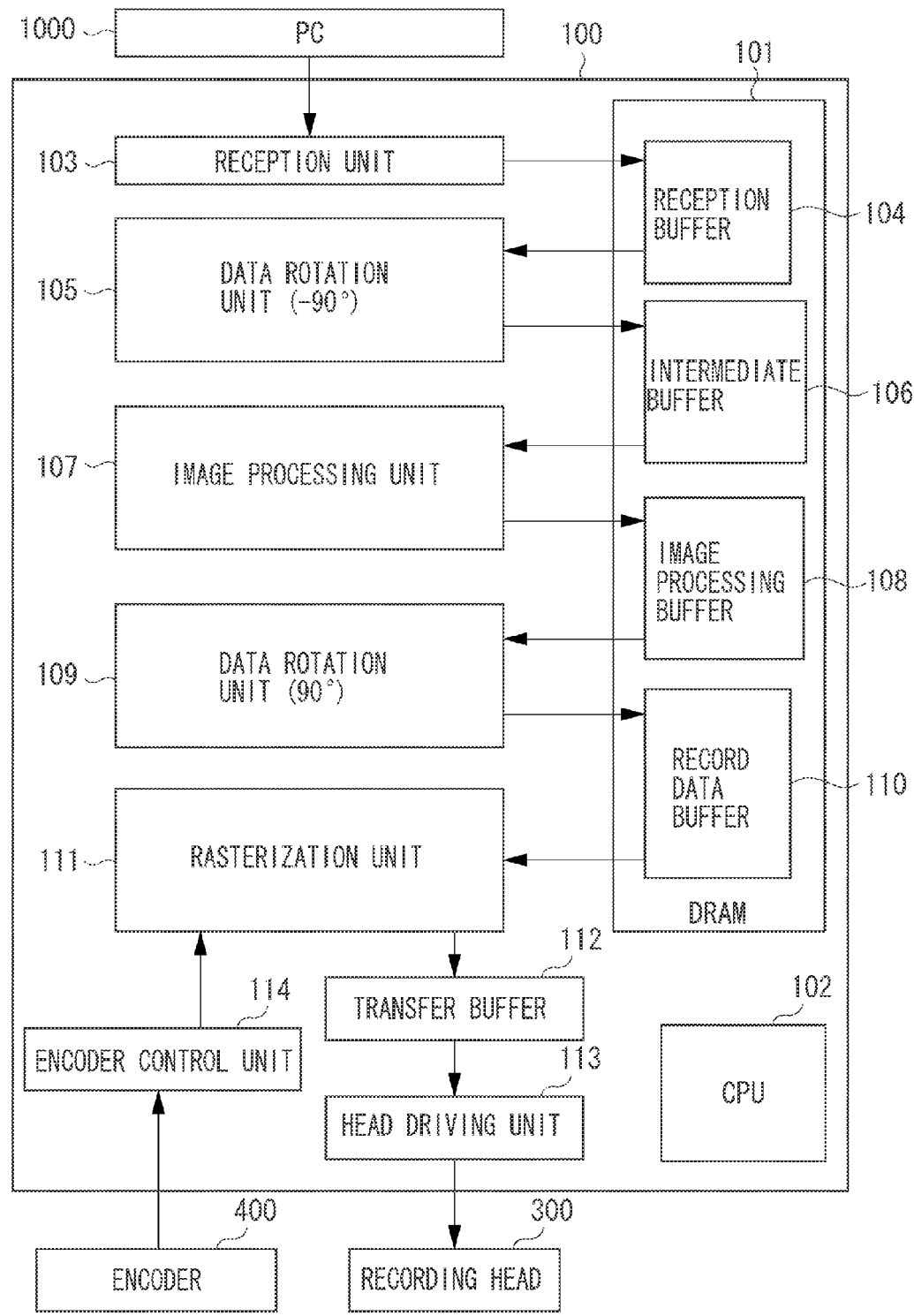

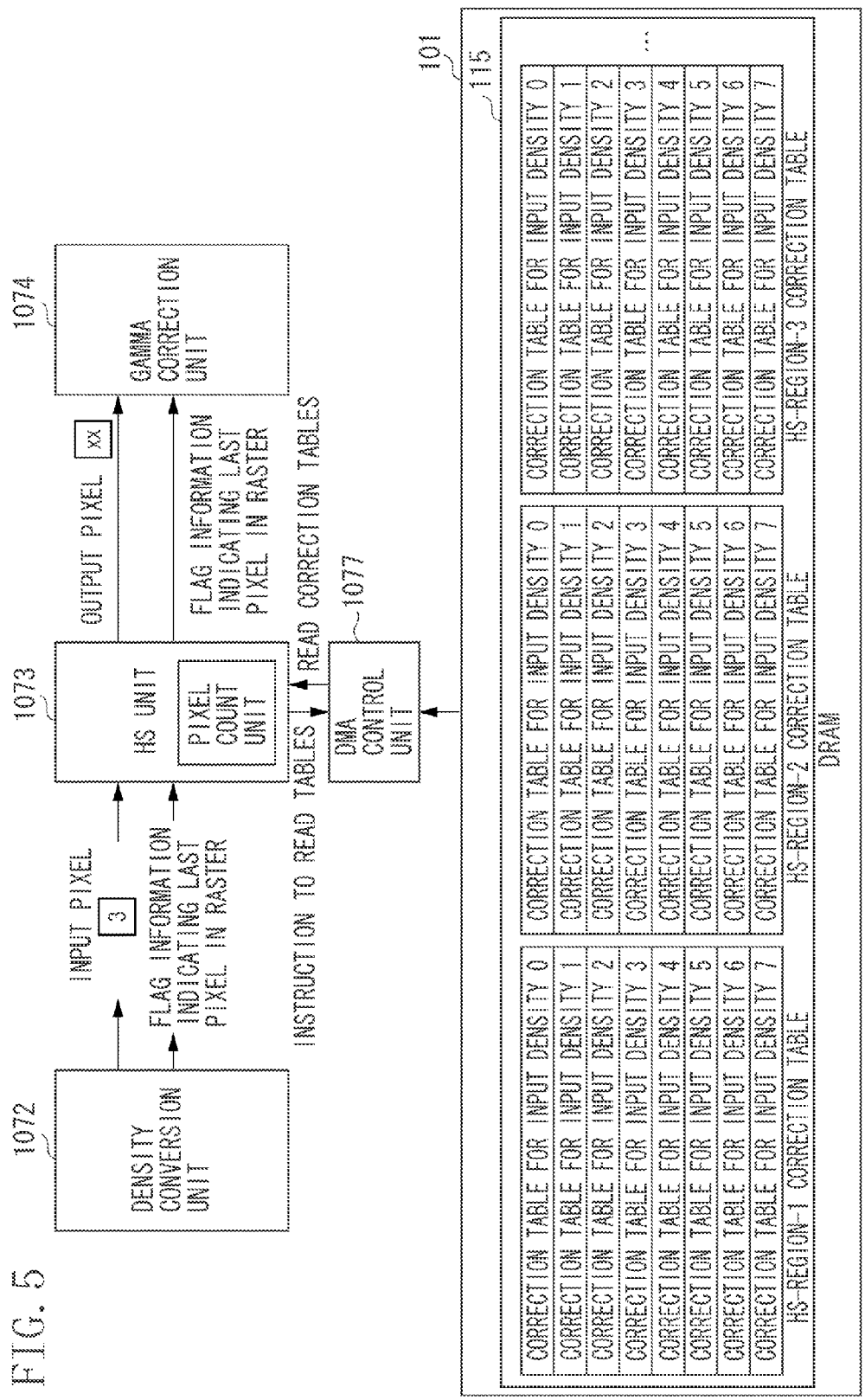

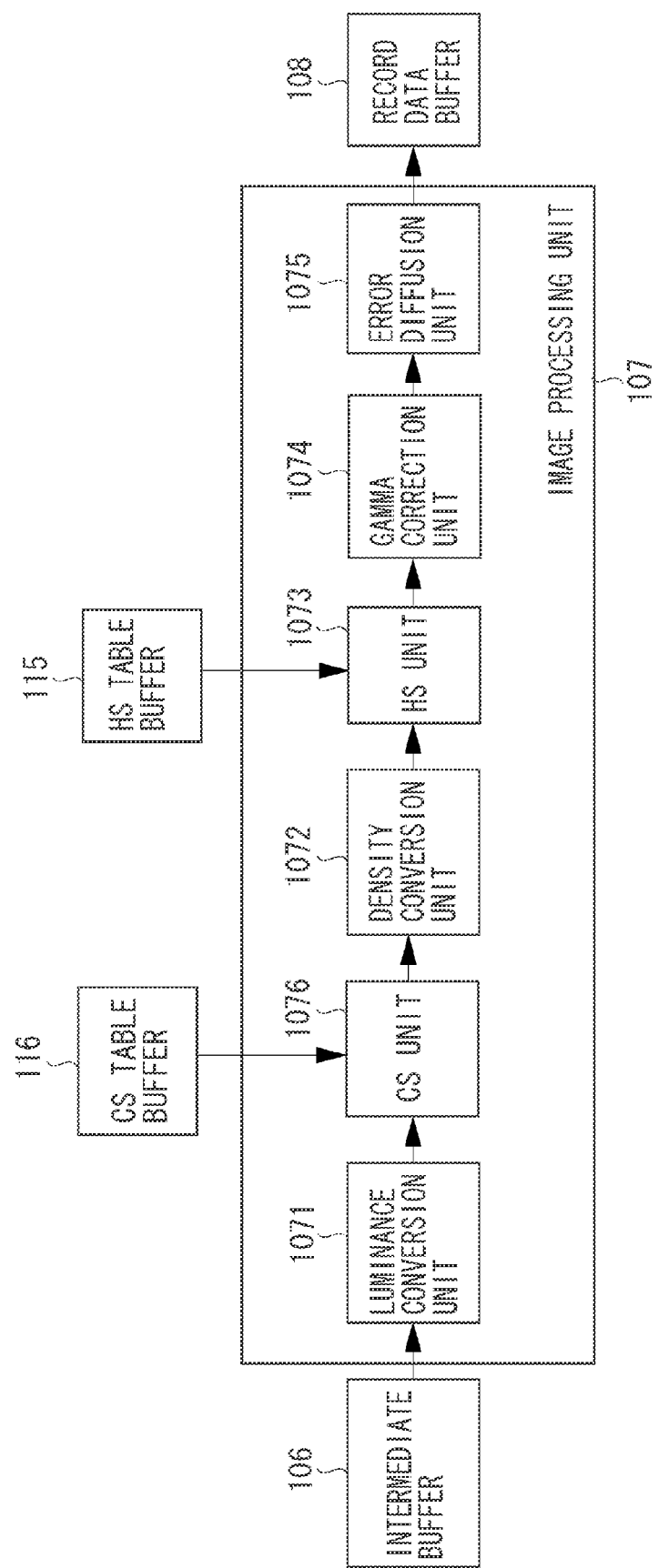

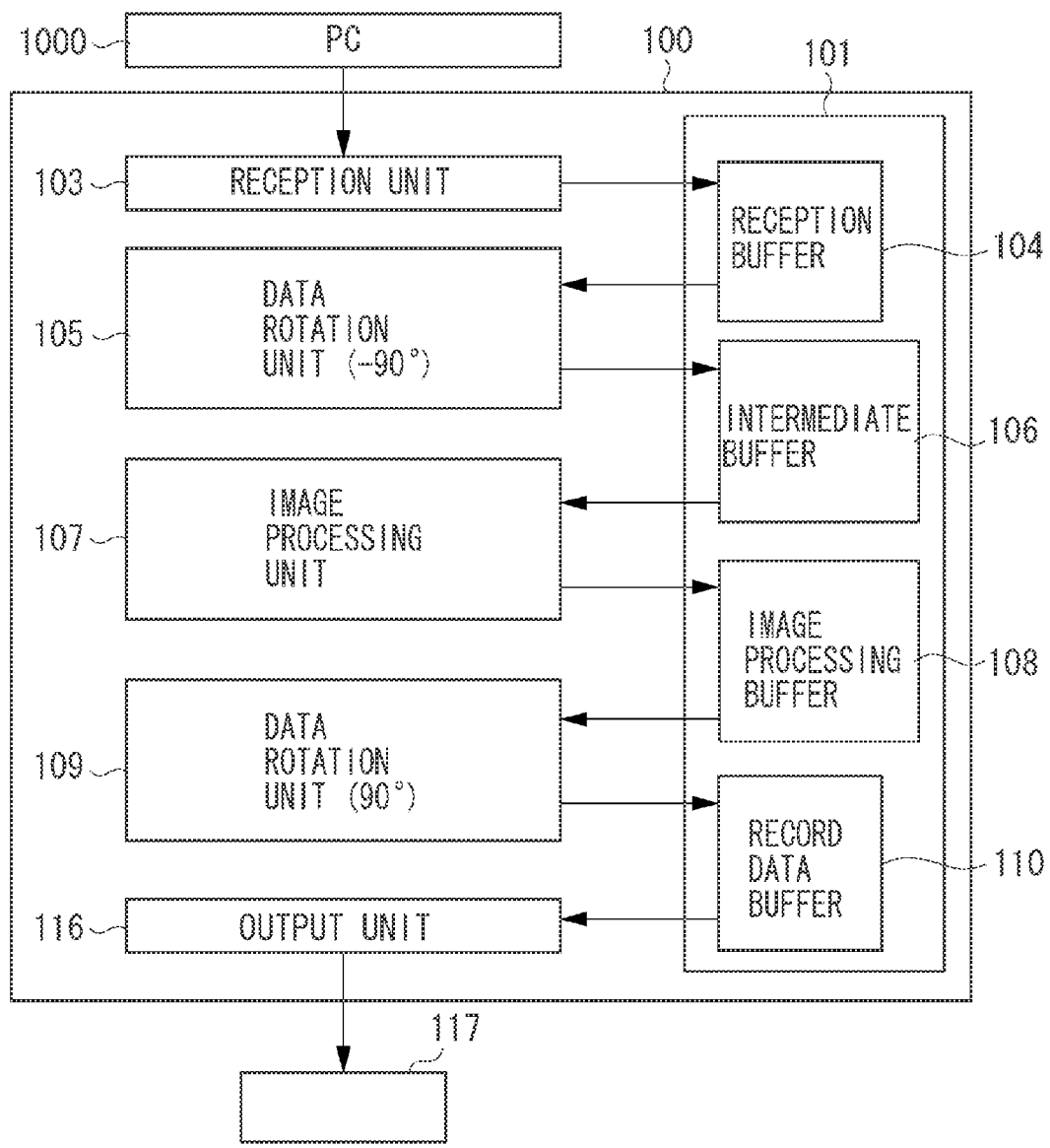

US 8,995,017 B2

IMAGE PROCESSING APPARATUS AND RECORDING APPARATUS

CROSS REFERENCE TO RELATED APPLICATIONS

The present application is a continuation of U.S. patent application Ser. No. 12/958,226, filed on Dec. 1, 2010, which claims priority from Japanese Patent Application No. 2010-137475, filed Jun. 16, 2010, all of which are hereby incorporated by reference herein in their entirety.

BACKGROUND OF THE INVENTION

1. Field of the Invention

The present invention relates to an image processing apparatus for correcting image data and a recording apparatus.

2. Description of the Related Art

Japanese Patent Application Laid-Open No. 5-220977 describes image recording by a recording head in which image data is corrected using correction information stored in correction tables to reduce density variations caused by differences in the amount of ink discharged from recording elements.

To achieve high-quality image recording at high speed, however, it is necessary to perform image processing including image data correction in a short time.

SUMMARY OF THE INVENTION

According to an aspect of the present invention, an image processing apparatus may supply image data to a recording apparatus The recording apparatus may convey a recording medium in a direction intersecting a direction in which recording elements are arranged and may record on the recording medium. The image processing apparatus includes tables containing correction information for each group into which the recording elements are divided, an input unit to receive multi-valued data in raster format, a horizontal/vertical conversion unit to convert the multi-valued data into column format, a first buffer, a correction unit, a second buffer, a vertical/horizontal conversion unit, and an output unit. The first buffer stores the sorted multi-valued data. The correction unit uses stored correction information corresponding to a group to correct multi-valued data received from the first buffer and belonging to that group The second buffer stores the corrected multi-valued data. The vertical/horizontal conversion unit converts the multi-valued data stored in the second buffer into raster format. The output unit outputs the converted data in raster format to the recording apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate the configuration of an image processing unit according to the first exemplary embodiment.

FIG. 4 illustrates the control configuration of a recording apparatus (image processing apparatus) according to the first exemplary embodiment.

FIG. 5 illustrates an HS unit according to the first exemplary embodiment.

FIG. 6 illustrates the configuration of an image processing unit according to the second exemplary embodiment.

FIG. 12 illustrates the configuration of an image processing apparatus.

DESCRIPTION OF THE EMBODIMENTS

Various exemplary embodiments, features, and aspects of the invention will be described in detail below with reference to the drawings.

Figure 1:
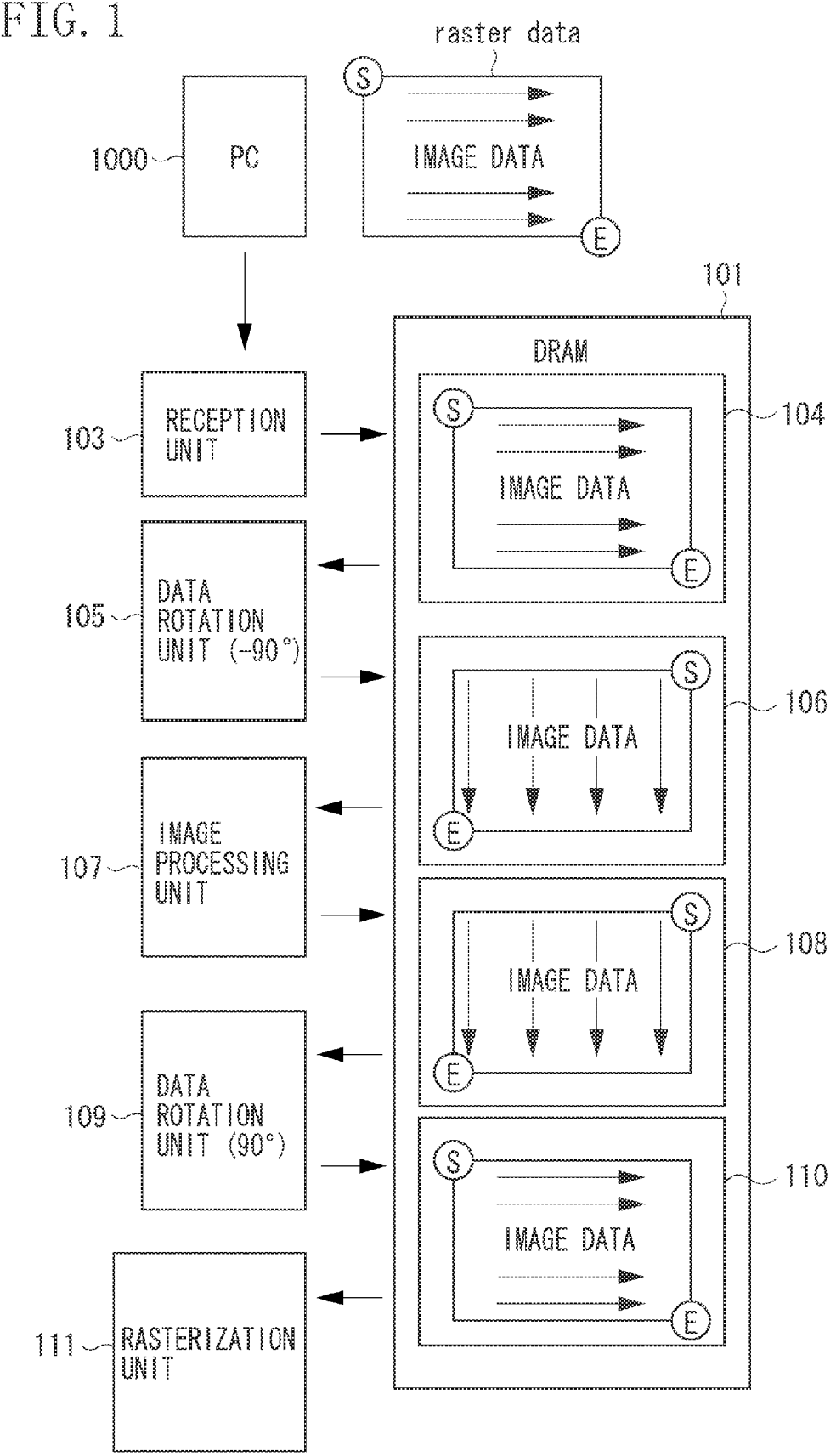
FIG. 1 illustrates processing of image data according to first and second exemplary embodiments.

With reference to FIG. 1, processing of image data (multi-valued data) according to a first exemplary embodiment will be described. A reception unit (input unit) 103 receives image data from information-processing equipment 1000. The image data is multi-valued data for four rasters, for example, where a raster includes a computer image that is composed of an array of pixels arranged in rows and columns as a generally rectangular grid and each pixel (picture element) is a single point in a raster image.

The multi-valued data is stored in a reception buffer 104 in the order in which the multi-valued data is received from information-processing equipment 1000. A buffer may be used for temporary storage of data that is waiting to be sent elsewhere as a way to compensate for differences in the rate of flow of data between components of a computer system. A data rotation unit (horizontal/vertical conversion unit) 105 reads the multi-valued data from the reception buffer 104 and sorts the multi-valued data (in other words, converts the multi-valued data in raster format into column format) to store the sorted multi-valued data in an intermediate buffer 106. An image processing unit 107 reads the data from the intermediate buffer 106. The image processing unit 107 includes a head shading (HS) unit for performing HS processing. In head shading (HS) processing, image data is converted into image data according to the amount of discharge from nozzles.

FIG. 2B illustrates image data. For the sake of simplicity of description, it is assumed that the image data contains data for four rasters, and contains six pixels for each raster. In FIG. 2B, regions 2, 3, and 4 indicate recording element regions illustrated in FIG. 3B. In a recording element row including recording elements, adjacent recording elements are divided in advance to define multiple regions (groups). In FIG. 2B, data in the first pixel is data in the first pixel in the region 2. Hence, a Direct Memory Access (DMA) control unit 1077 reads an HS-region-2 correction table stored in a correction buffer 115 to correct the data in the first pixel.

The reception buffer 104 illustrated in FIG. 1 stores data in raster format. Since the data rotation unit 105 performs sorting (horizontal/vertical conversion), the intermediate buffer 106 stores data column by column. FIG. 1 schematically shows that due to the sorting of the multi-valued data, the data stored in the intermediate buffer 106 is rotated 90 degrees.

After completing processing of data, the image processing unit 107 stores the data in a buffer 108. Then, a data rotation unit (vertical/horizontal conversion unit) 109 reads the multi-valued data from the buffer 108 to sort the multi-valued data (to convert the multi-valued data in column format into raster format). More specifically, the data rotation unit (vertical/horizontal conversion unit) 109 returns the image data to the form in which the image data was arranged similar to when the image data was received. The data rotation unit (vertical/horizontal conversion unit) 109 then stores the sorted multi-valued data in a buffer 110. When stored in the buffer 110, the multi-valued data is associated with the order of arrangements of the recording elements. A data rasterization unit 111 generates binary data from the multi-valued data, where the binary data may be data encoded in binary form as file data having a sequence of characters such as hexadecimal, decimal, binary, or American Standard Code for Information Interchange (ASCII) characters.

Figure 3A:
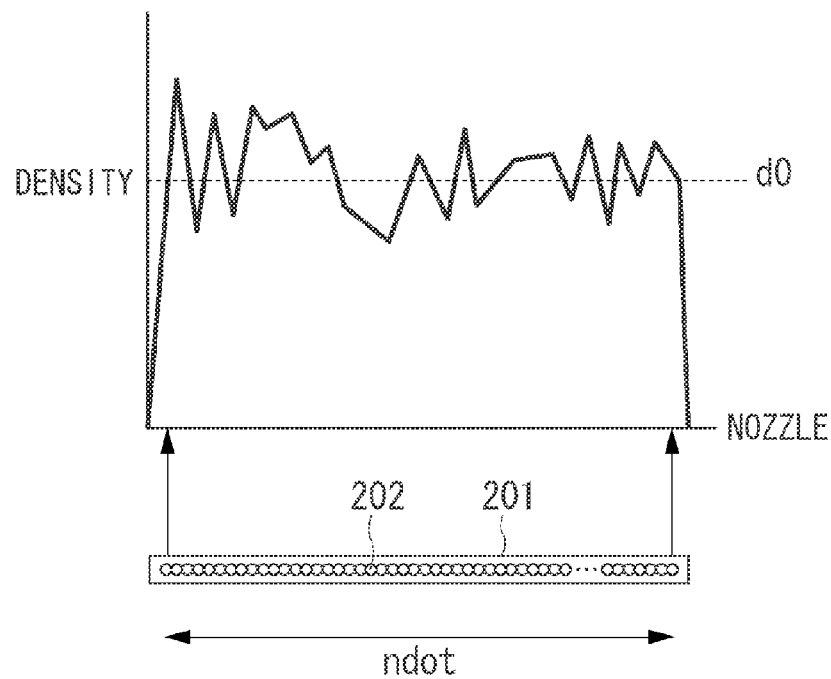
FIGS. 3A and 3B illustrate recording characteristics of recording elements, multi-valued data, and binary data.
Figure 3B:
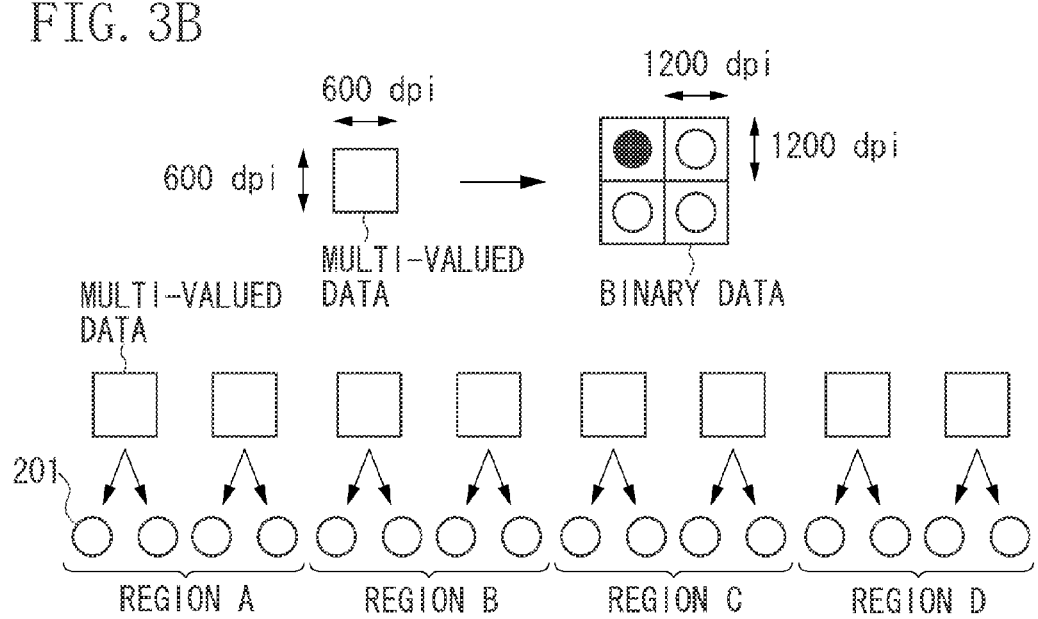

Generation of binary data will be described. As illustrated in FIG. 3B, the data rasterization unit 111 generates four pieces of 1-pixel (1200 dpi (dots per inch)) binary data from a piece of 1-pixel (600 dpi) multi-valued data. Thus, in the case of data for one raster, data for two dots (corresponding to two recording elements) is generated from 1-pixel multi-valued data. Raster data, corresponding to the arrangements of the recording elements 201, is sequentially assigned to the recording elements 201.

Figure 2A:
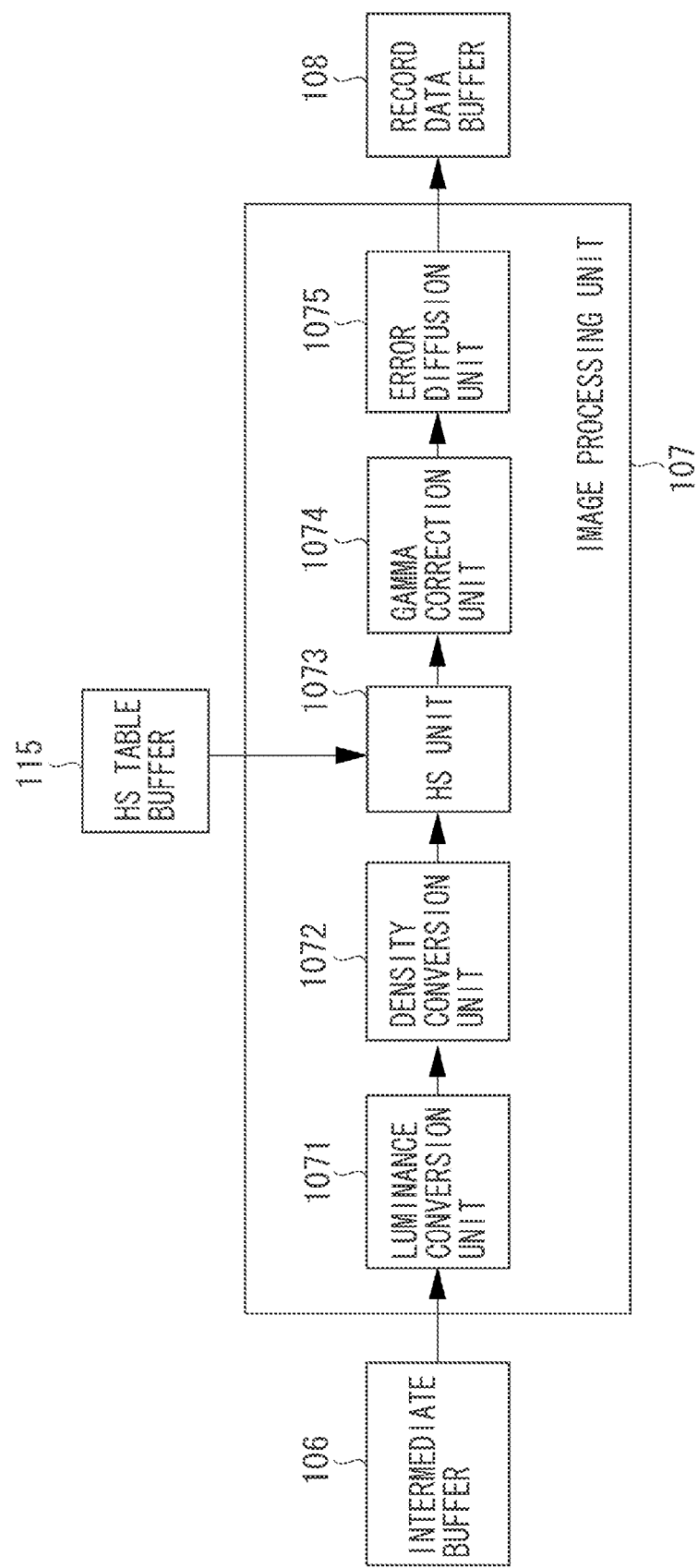

FIG. 2A illustrates the configuration of the image processing unit 107. The image processing unit 107 includes a luminance conversion unit 1071, a density conversion unit 1072, an HS unit 1073, a gamma correction unit 1074, and an error diffusion unit 1075. The luminance conversion unit 1071 converts standard Red, Green, Blue (sRGB) data representing colors on a monitor into RGB (red, green, and blue) data within a color reproduction range of a printer. The luminance conversion unit 1071 performs conversion processing using a three-dimensional look-up table (LUT). The density conversion unit 1072 converts the RGB data into CMYK (cyan-magenta-yellow-black) data. As illustrated in FIG. 3A, the recording elements vary in recording characteristics, causing density differences among the recording elements. To reduce such density differences, the HS unit 1073, in brief, alters (corrects) density data.

FIG. 4 illustrates the control configuration of a controller 100. The controller 100 includes a central processing unit (CPU) 102, a transfer buffer 112, a head driving unit 113, and an encoder control unit 114 in addition to the components illustrated in the block diagram of FIG. 1. The transfer buffer 112 stores binary data generated by the rasterization unit (generation unit) 111. A transfer unit in the head driving unit 113 reads the binary data from the transfer buffer 112 to transfer the binary data to a recording head 300. The head driving unit 113 generates and outputs signals for driving the recording elements.

FIG. 5 illustrates processing performed by the HS unit 1073. The HS unit 1073 receives multi-valued data processed by the density conversion unit 1072 pixel by pixel, corrects the received data, and outputs the corrected data to the gamma correction unit 1074 pixel by pixel.

In this processing, the HS unit 1073 reads correction tables for the region 2 from the correction buffer 115 by using DMA (Direct Memory Access) control unit 1077. In the present exemplary embodiment, the HS unit 1073 reads eight levels of tables, from density level 0 to density level 7. The HS unit 1073 then corrects the data in the region 2. For example, as illustrated in FIG. 2B, the HS unit 1073 processes the data in the columns 1 and 2. Since the first pixel in the column 1 has a value of 3, for example, the HS unit 1073 refers to a correction value (correction information) in the table for an input density of 3 to perform correction. In the present exemplary embodiment, the correction value is −1, so the correction result is 2, which is output to the gamma correction unit 1074. The HS unit 1073 corrects the other data in the column 1 in the same manner. The HS unit 1073 then corrects the data in the column 2 in FIG. 2B in the same way. After completing the correction of the image data in the region 2, the HS unit 1073 reads correction tables for the data in the region 3. Then, the HS unit 1073 sequentially corrects the data in the region 3 in the same manner. After completing the correction of the image data in the region 3, the HS unit 1073 reads correction tables for the data in the region 4 to perform correction processing in the same manner. In this way, the HS unit 1073 changes the region to be corrected from one region to the next, and reads correction tables corresponding to the current correction target region.

In the first exemplary embodiment, data for two columns is provided in each region, and correction processing is performed column by column. However, correction processing may be performed in units of two columns (multiple columns).

The HS unit 1073 includes, for example, a static random access memory (SRAM) for storing read correction tables. The HS unit 1073 stores correction tables and refers to a correction value according to the density value of data to perform correction processing. In the first exemplary embodiment, the correction value for a density within a region is the same for any pixel location in that region. However, the correction value may be changed for each pixel location.

The HS unit 1073 prepares two tables (for two regions) in the SRAM and assigns the two tables to a write area and a read area, respectively. This enables the HS unit 1073 to reduce the table access time by alternately updating the tables for the two regions.

To perform the processing described above, the HS unit 1073 includes a raster count unit for counting the number of rasters and a pixel count unit for counting the number of pixels. The HS unit 1073 receives parameters for performing HS processing. Examples of the parameters include information on the number of rasters, information on the length of the number of pixels contained in each raster, and flag information indicating the last pixel in each raster.

As set forth above, multiple rasters forming image data are corrected in the same region units, thereby reducing the number of times the correction tables prepared for each region are read.

To be specific, if correction processing is performed on the same rasters without implementing the present exemplary embodiment, correction of the first raster will require reading the correction tables prepared for each region three times. Accordingly, if correction processing is performed for four rasters, which is the case described above, a total of 12 (=3×4) read operations will be required. This increases the frequency of access to the memory, and hence causes constraints on the use of the bus. In contrast, in the present exemplary embodiment, it is sufficient to read the correction tables prepared for each region only three times.

The controller 100 illustrated in FIG. 4 has the configuration including the head driving unit 113, the encoder control unit 114, the rasterization unit 111, and the other units. However, the controller 100 is not limited to this configuration. For example, as illustrated in FIG. 12, the image processing apparatus may also be configured to receive image data from the information-processing equipment 1000, perform image processing, and include an output unit 116 for outputting multi-valued data to an engine unit 117.

A second exemplary embodiment will be described below. The second exemplary embodiment will be described only in terms of its differences from the first exemplary embodiment, and the description provided in the first exemplary embodiment will be omitted.

FIG. 6 illustrates the configuration of an image processing unit 107 according to the second exemplary embodiment. In the second exemplary embodiment, a color shading (CS) unit 1076 for performing color shading (CS) processing is interposed between a luminance conversion unit 1071 and a density conversion unit 1072. Luminance relates to perceived brightness and to intensity per unit area of light travelling in a given direction. In CS correction performed by the CS unit 1076, an RGB luminance signal (luminance data) is converted to correct color differences. This processing reduces color differences even if the amount of ink discharge varies among the nozzles.

Figure 7:
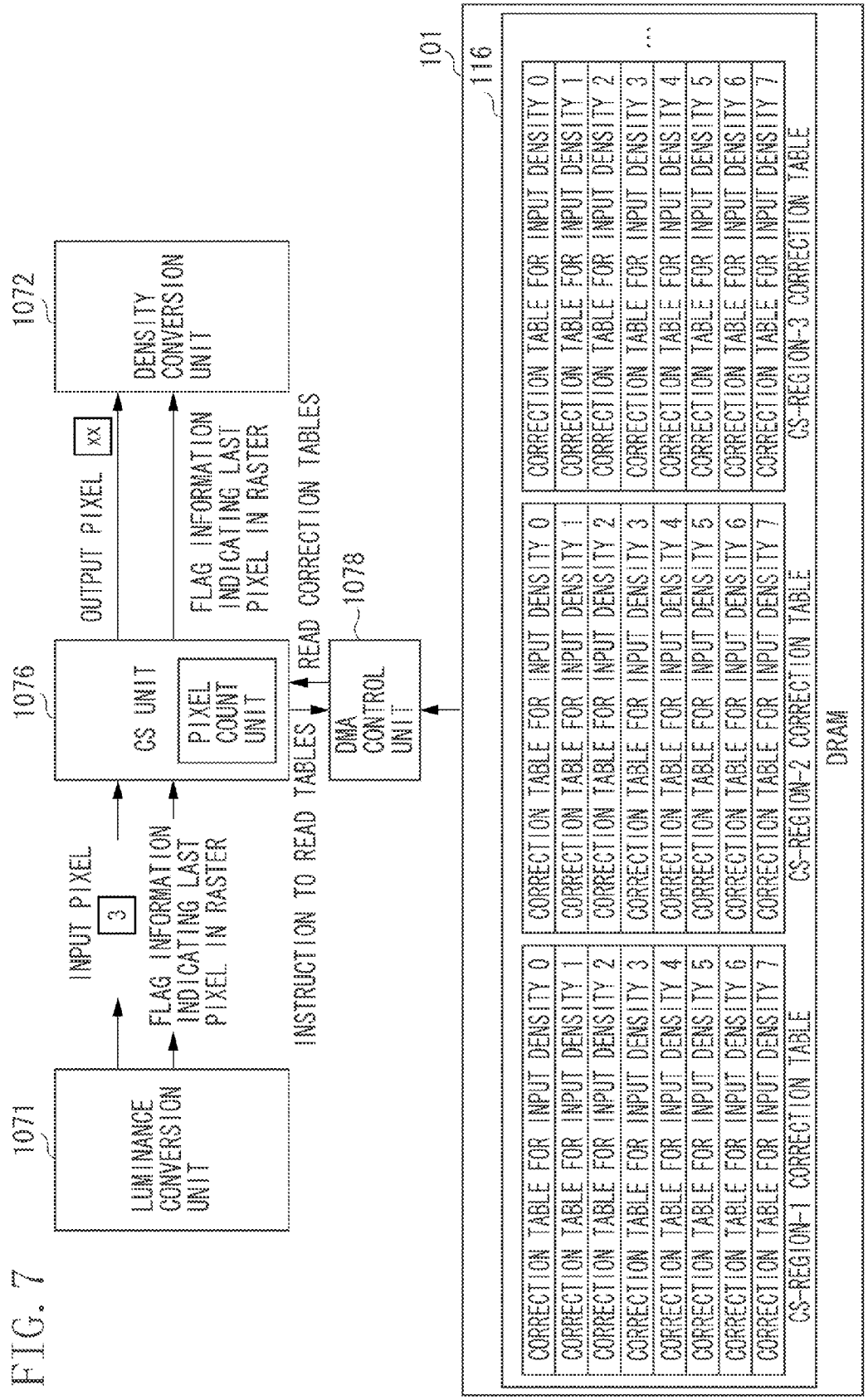
FIG. 7 illustrates a CS unit according to the second exemplary embodiment.

FIG. 7 illustrates the CS unit 1076. Like the HS unit 1073 performing the processing illustrated in FIG. 5, the CS unit 1076 receives multi-valued data on a pixel-by-pixel basis and converts the received data using a three-dimensional look-up table. The CS unit 1076 reads correction tables from the correction buffer 116 by using DMA(Direct Memory Access) control unit 1078.

The image processing unit 107 according to the second exemplary embodiment may be configured so as not to include an HS (head shading) unit 1073 and an HS table buffer 115.

An example recording apparatus (printer) employing an inkjet system applicable to the first and second exemplary embodiments will be described. The printer, which uses a continuous sheet(s) in roll form, is a line printer capable of both single-sided printing and two-sided printing. A unit of printing may be referred to as one page, a page, one unit image, or a unit image and an elongated or long continuous sheet is longer than repeated units of printing in the conveying direction of the sheet.

Figure 8:
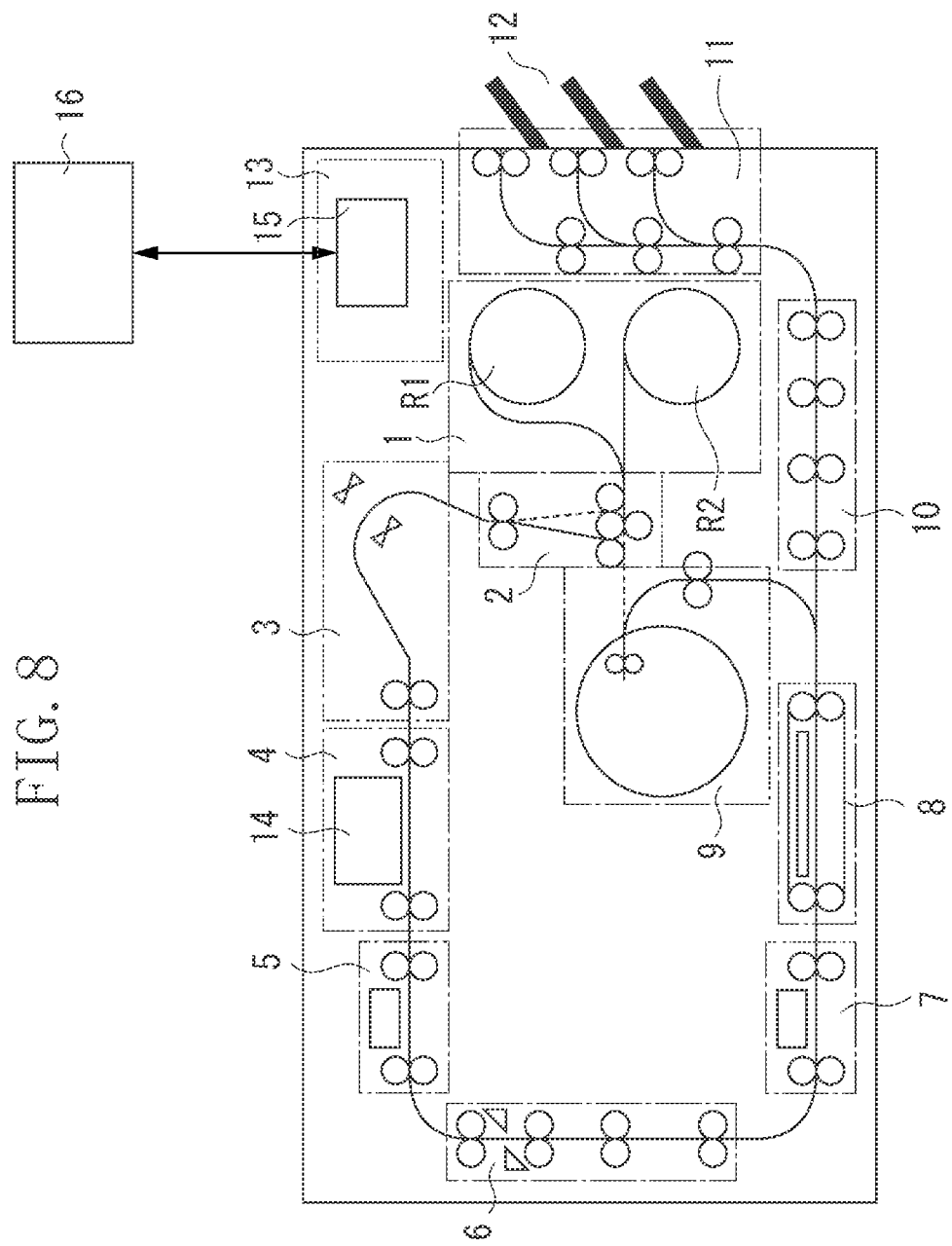
FIG. 8 is a cross-sectional view illustrating a recording apparatus.

FIG. 8 is a cross-sectional view schematically illustrating the printer. The printer includes, as its major units, a sheet feed unit 1, a decurl unit 2, a skew correction unit 3, a print unit 4, an inspection unit 5, a cutter unit 6, an information recording unit 7, a drying unit 8, a sheet take-up unit 9, a discharge/conveyance unit 10, a sorter unit 11, discharge trays 12, and a control unit 13. A conveying mechanism, including pairs of rollers and a belt, conveys a sheet along a sheet conveyance path indicated by a solid line in FIG. 8 so that the sheet is processed in each unit.

The sheet feed unit 1 holds and feeds continuous sheets in roll form. The sheet feed unit 1 can hold two rolls R1 and R2, and selectively pulls and feeds a sheet. The number of rolls that can be held is not limited to two, and the sheet feed unit 1 may hold one or three or more rolls. The decurl unit 2 reduces the amount of curling (bending) in the sheet fed from the sheet feed unit 1. In the decurl unit 2, two pinch rollers are used for one drive roller to press and curve the sheet so that the sheet bends in the direction opposite to the curl direction, thereby reducing the curling. The skew correction unit 3 corrects skew (a displacement from the direction in which the sheet should advance) in the sheet that has passed through the decurl unit 2. The skew correction unit 3 corrects skew of the sheet by pressing an edge of the sheet on a reference side against a guide member.

In the print unit 4, an image is formed on the conveyed sheet by a print head 14. The print unit 4 further includes conveyance rollers for conveying the sheet. The print head 14 includes line print heads having inkjet nozzle rows in an area covering the maximum width of sheets that are expected to be used. In the print head 14, the multiple print heads are arranged in parallel in the conveyance direction. In the present exemplary embodiment, the print head 14 includes seven print heads corresponding to seven colors: cyan (c), magenta (M), yellow (Y), light cyan (LC), light magenta (LM), gray (G), and black (K). As illustrated in FIG. 3B, the print heads have recording elements arranged in a direction intersecting the direction in which a recording medium is conveyed. The number of colors and the number of print heads are not limited to seven. The inkjet system may employ a system including heating elements, piezoelectric elements, electrostatic elements, or microelectromechanical system (MEMS) elements, for example. The print head 14 is supplied with ink of each color from an ink tank through an ink tube.

Skew detection units may be disposed upstream and downstream of the print head 14 in the conveyance direction. The skew detection units detect an edge of a recording medium in the conveyance direction with an optical line sensor. The skew detection units receive signals from the line sensor at regular time intervals and perform processing to thereby obtain information on lateral deviation and skew of the recording medium.

The inspection unit 5 optically reads an inspection pattern and/or an image printed on the sheet in the print unit 4, to check the condition of nozzles of the print heads, the condition of the sheet conveyance, and the location of the image, for example. The cutter unit 6 includes a mechanical cutter for cutting the printed sheet in predetermined lengths. The cutter unit 6 further includes conveyance rollers for directing the sheet into the subsequent step. The information recording unit 7 records print information, such as print serial numbers and date, on the back side of the cut sheet. The drying unit 8 heats the sheet printed in the print unit 4 to quickly dry the applied ink. The drying unit 8 also includes a conveyance belt and conveyance rollers for directing the sheet to the subsequent step.

In the case of two-sided printing, the sheet take-up unit (sheet flipping unit) 9 temporarily takes up the continuous sheet after printing on the top side. The sheet take-up unit 9 includes a take-up drum which rotates to take up the sheet. The uncut continuous sheet having printing on its top side is temporarily wrapped around the take-up drum. When the wrapping operation is complete, the take-up drum rotates in the reverse direction to feed the wrapped sheet to the decurl unit 2. The sheet is then directed to the print unit 4. Since the sheet has been flipped over by the sheet take-up unit (sheet flipping unit) 9 so that its top side becomes the back side, while the back side becomes the top side, the back side is ready for printing in the print unit 4. More specific details of two-sided printing operation will be described later.

The discharge/conveyance unit 10 receives each sheet cut in the cutter unit 6 and dried in the drying unit 8, and conveys the sheet to the sorter unit 11. When necessary, the sorter unit 11 discharges printed sheets into different trays 12 to divide the sheets into respective groups. The control unit 13 controls each unit in the entire printer. The control unit 13 includes control circuits such as the above-described CPU and an ASIC, a memory, a controller 15 provided with various I/O interfaces, and a power source. The operation of the printer is controlled according to instructions from the controller 15 or from an external device 16, such as a host computer, connected to the controller 15 through an I/O interface.

Recording operation will be described below. Since single-sided printing operation and two-sided printing operation are different, each operation will be described.

Figure 9:
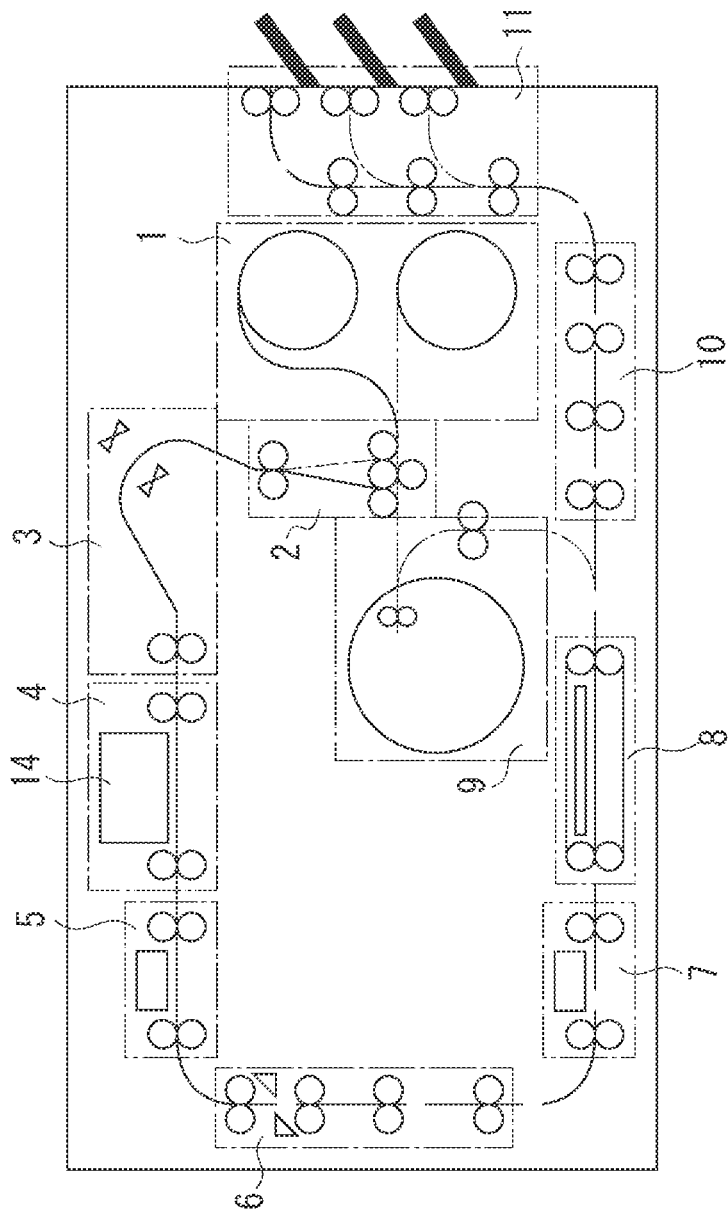
FIG. 9 illustrates conveying operation in the recording apparatus.

FIG. 9 illustrates single-sided printing operation. The thick line in FIG. 9 indicates a conveyance path along which a sheet fed from the sheet feed unit 1 is conveyed so as to be printed and finally discharged into the discharge trays 12. In the print unit 4, top-side printing is performed on the sheet fed from the sheet feed unit 1 and processed in the decurl unit 2 and in the skew correction unit 3. After passing through the inspection unit 5, the printed sheet is cut in predetermined unit lengths in the cutter unit 6. In the information recording unit 7, print information is recorded on the back side of each cut sheet as needed. Each cut sheet is conveyed to the drying unit 8 for drying. Then, each sheet is sequentially discharged through the discharge/conveyance unit 10 into a tray 12 of the sorter unit 11, where the sheets are stacked.

Figure 10:
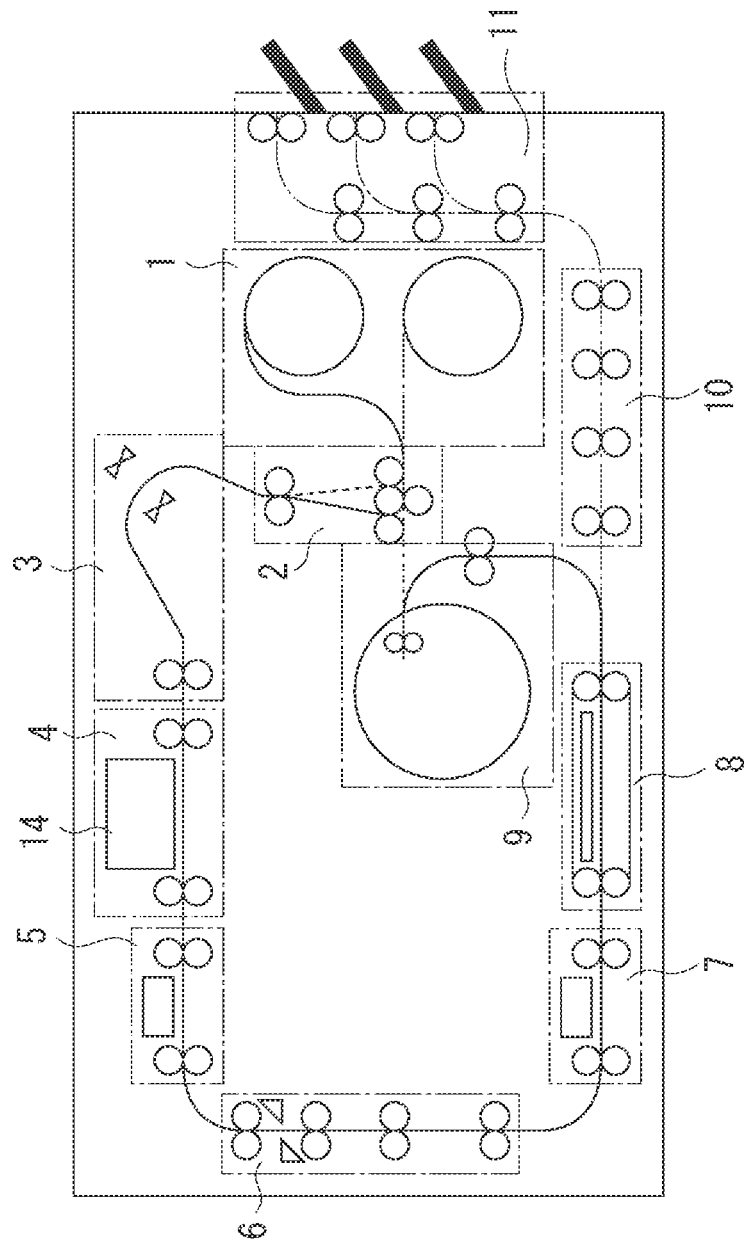
FIG. 10 illustrates conveying operation in the recording apparatus.

FIG. 10 illustrates two-sided printing operation. In two-sided printing, a top-side printing sequence is followed by a back-side printing sequence. In the top-side printing sequence, which is performed first, the five units, from the sheet feed unit 1 to the inspection unit 5, operate in the same manner as in the above-described one-sided printing operation. However, the cutter unit 6 does not perform cutting operation and the continuous sheet is conveyed to the drying unit 8. After the ink on the top-side is dried in the drying unit 8, the sheet is introduced along the path toward the sheet take-up unit 9, instead of along the path toward the discharge/conveyance unit 10. The introduced sheet is wrapped around the take-up drum of the sheet take-up unit 9 rotating in the forward direction (a counterclockwise direction in FIG. 10). When all of the predetermined printing on the top-side is complete in the print unit 4, the cutter unit 6 cuts the continuous sheet at the rear edge of the print zone. After passing through the drying unit 8, the continuous sheet (i.e., the printed part) located downstream of the cut position in the conveyance direction is completely taken up by the sheet take-up unit 9 until the sheet rear edge (the cut position) is reached. On the other hand, the continuous sheet located upstream of the cut position in the conveyance direction is rolled up so as to be fed back to the sheet feed unit 1 so that the sheet's leading edge (the cut position) is not left in the decurl unit 2.

After the top-side printing sequence described above, a back-side printing sequence is performed. The take-up drum of the sheet take-up unit 9 rotates in a direction (a clockwise direction in FIG. 10) opposite to the sheet take-up direction. The edge of the sheet that has been taken up is fed into the decurl unit 2 with the sheet's rear and leading edges interchanged (specifically, the sheet's edge serving as the rear edge during the sheet take-up operation now becomes the leading edge). The decurl unit 2 corrects the curl in a direction opposite to the previous curl-correction direction. This is because the sheet has been wrapped around the take-up drum with its sides flipped over so that the side serving as the roll's top side in the sheet feed unit 1 becomes the back side, while the back side becomes the top side, resulting in the sheet curl in the opposite direction. Then, after processing in the skew correction unit 3, back-side printing is performed on the continuous sheet in the print unit 4. After passing through the inspection unit 5, the printed sheet is cut in predetermined unit lengths in the cutter unit 6. Since each cut sheet has printing on both sides, recording is not performed on the cut sheet in the information recording unit 7. Each cut sheet is conveyed to the drying unit 8, and then sequentially discharged through the discharge/conveyance unit 10 into one of the trays 12 of the sorter unit 11, where the sheets are stacked.

Other Embodiments

The exemplary embodiments set forth above are not limited to the ones showing the numbers provided in the foregoing description. For example, while the HS unit and the CS unit are described as examples of an image correction unit, they may be applied to other correction processing.

The number of recording elements included in each recording element row, for example, is not limited to 16 or 40. Also, the number of recording element groups is not limited to 4 or 20. Furthermore, the number of recording elements forming each group is not limited to 4, but may be any appropriate number, such as 16 or 32, for example.

In the foregoing exemplary embodiments, the image data has eight density levels and eight luminance levels. However, the density levels and the luminance levels are not limited to this, and may also be 128 levels or 256 levels. In the foregoing description, the image data for four rasters is processed, however, the image data is not limited to this value.

Figure 11:
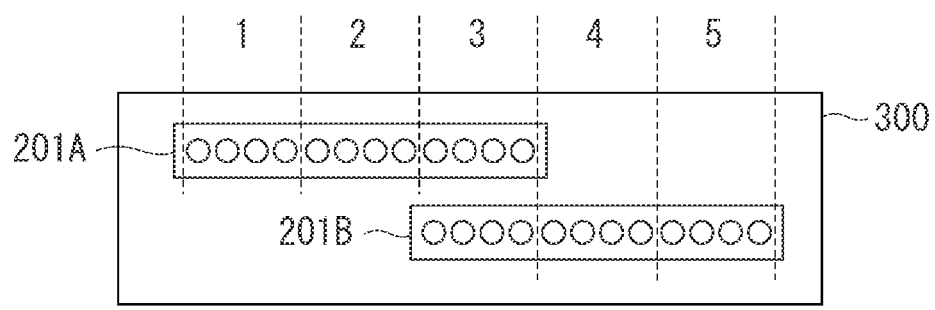
FIG. 11 illustrates a recording head according to another exemplary embodiment.

Furthermore, in the recording head configuration, recording element rows 201A and 201B may be arranged in a recording head 300 as illustrated in FIG. 11, for example. In this case, as illustrated in FIG. 11, regions 1 to 5 are assigned. For the regions 1 and 2, correction tables for the recording element row 201A are used. For the regions 4 and 5, correction tables for the recording element row 201B are used. For the region 3, the correction tables for the recording element rows 201A and 201B are used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus for obtaining multi-valued image data to record an image on a recording medium by using a recording head having plural recording elements with relative scanning between the recording medium and the recording head in a direction intersecting a direction in which the recording elements of the recording head are arranged, the apparatus comprising:

an input unit configured to input multi-valued image data in raster format corresponding to the direction in which the recording elements of the recording head are arranged, wherein the multi-valued image data includes plural raster lines;

a conversion unit configured to convert the input multi-valued image data from raster format into column format;

a storing unit configured to store the input multi-valued image data converted by the converting unit in column format into a first memory, wherein the stored multi-valued image data includes plural column lines; and a processing unit configured to correct a level of the input multi-valued image data in column format by using a plurality of pieces of correction information corresponding to one group of plural groups, into which the plural recording elements are grouped, wherein the plurality of pieces of the correction information are stored in a second memory, wherein the processing unit reads the multi-valued image data including plural pixels stored in the first memory and reads a plurality of pieces of correction information corresponding to one group, and corrects the level of the multi-valued image data including plural pixels in column format read from the first memory by one or more columns among one or more columns corresponding to the one group by reading the plurality of pieces of correction information corresponding to the one group from the second memory once so as to reduce a number of times in which a plurality of pieces of correction information corresponding to one group are read.

2. The apparatus according to claim 1, wherein the conversion unit converts from raster format into column format by rotating the input multi-valued image data by plus 90 degrees or minus 90 degrees.

3. The apparatus according to claim 1, wherein the correcting unit corrects the input multi-valued image data for reducing a color difference of which the image recorded on the recording medium by using the recording head each of the plurality of groups.

4. The apparatus according to claim 1, wherein the correcting unit corrects a density value of the input multi-valued image data.

5. The apparatus according to claim 1, further comprising a second converting unit configured to convert the multi-valued image data corrected by the correction unit from column format into raster format.

6. A method for an apparatus to obtain multi-valued image data to record an image on a recording medium by using a recording head having plural recording elements with relative scanning between the recording medium and the recording head in a direction intersecting a direction in which the recording elements of the recording head are arranged, the method comprising:
inputting multi-valued image data in raster format corresponding to the direction in which the recording elements of the recording head are arranged, wherein the multi-valued image data includes plural raster lines;
converting the input multi-valued image data from raster format into column format;
storing the converted input multi-valued image data in column format into a first memory, wherein the stored multi-valued image data includes plural column lines; and
correcting a level of the input multi-valued image data in column format by using a plurality of pieces of correction information corresponding to one group of plural groups, into which the plural recording elements are grouped, wherein the plurality of pieces of the correction information are stored in a second memory,
wherein correcting includes reading the multi-valued image data including plural pixels stored in the first memory and reading a plurality of pieces of correction information corresponding to one group, and correcting the level of the multi-valued image data including plural pixels in column format read from the first memory by one or more columns among one or more columns corresponding to the one group by reading the plurality of pieces of correction information corresponding to the one group from the second memory once so as to reduce a number of times in which a plurality of pieces of correction information corresponding to one group are read.

7. The method according to claim 6, wherein, in the converting, the input multi-valued image data is converted from raster format into column format by rotating the input multi-valued image data by plus 90 degrees or minus 90 degrees.

8. The method according to claim 6, wherein correcting includes correcting the input multi-valued image data for reducing a color difference of which the image recorded on the recording medium by using the recording head each of the plurality of groups.

9. The method according to claim 6, wherein correcting includes correcting a density value of the input multi-valued image data.

10. The method according to claim 6, further comprising converting the corrected multi-valued image data from column format into raster format.

11. A printer comprising the apparatus, the recording head, the first memory, and the second memory as recited in claim 1.

12. The printer according to claim 11, further comprising a feeding unit configured to feed the recording medium.

13. The printer according to claim 12, further comprising a reading unit configured to read a pattern image recorded on the recording medium fed by the feeding unit by using the recording head.

14. The printer according to claim 13, further comprising a cutter configured to cut the recording medium on which the pattern image is recorded.

15. The apparatus according to claim 5, further comprising a supplying unit configured to supply the multi-valued image data converted by the second converting unit to the recording head.

16. The method according to claim 10, further comprising supplying the converted multi-valued image data to the recording head.

17. The apparatus according to claim 1, further comprising a generation unit configured to generate binary data from the input multi-valued data corrected by the processing unit.

18. An apparatus for obtaining multi-valued image data to record an image on a recording medium by using a recording head having plural recording elements with relative scanning between the recording medium and the recording head in a direction intersecting a direction in which the recording elements of the recording head are arranged, the apparatus comprising:
an input unit configured to input multi-valued image data in raster format corresponding to the direction in which the recording elements of the recording head are arranged, wherein the multi-valued image data includes plural raster lines;
a conversion unit configured to convert the input multi-valued image data from raster format into column format; and
a processing unit configured to correct a value of the input multi-valued image data including plural pixels in column format by using a plurality of pieces of correction information, wherein a plurality of pieces of correction information including the correction information are stored in a memory,
wherein the processing unit reads correction information corresponding to one group of plural groups, into which the plural recording elements are grouped, and corrects the value of the multi-valued image data including plural pixels in column format by one or more columns among one or more columns corresponding to the one group by reading the correction information corresponding to the one group from the memory once so as to reduce a number of times in which the correction information corresponding to one group are read.

19. The apparatus according to claim 18, wherein the processing unit reads a plurality of pieces of correction information corresponding to one group of plural groups, and corrects the value of the multi-valued image data including plural pixels in column format by one or more columns among one or more columns corresponding to the one group by reading the plurality of pieces of correction information corresponding to the one group from the memory once so as to reduce a number of times in which the plurality of pieces of correction information corresponding to one group are read.

20. The apparatus according to claim 18, wherein the correcting unit corrects the input multi-valued image data for reducing a color difference of which the image recorded on the recording medium by using the recording head each of the plurality of groups.

21. The apparatus according to claim 18, wherein the correcting unit corrects a density value of the input multi-valued image data.

22. The apparatus according to claim 18, further comprising a generation unit configured to generate binary data from the input multi-valued data corrected by the processing unit.

23. The apparatus according to claim 18, further comprising the recording head.

24. A method for an apparatus to obtain multi-valued image data to record an image on a recording medium by using a recording head having plural recording elements with relative scanning between the recording medium and the recording head in a direction intersecting a direction in which the recording elements of the recording head are arranged, the method comprising:

inputting multi-valued image data in raster format corresponding to the direction in which the recording elements of the recording head are arranged, wherein the multi-valued image data includes plural raster lines;

converting the input multi-valued image data from raster format into column format; and correcting a value of the input multi-valued image data including plural pixels in column format by using a plurality of pieces of correction information, wherein a plurality of pieces of correction information including the correction information are stored in a memory, wherein correcting includes reading correction information corresponding to one group of plural groups, into which the plural recording elements are grouped, and correcting the value of the multi-valued image data including plural pixels in column format by one or more columns among one or more columns corresponding to the one group by reading the correction information corresponding to the one group from the memory once so as to reduce a number of times in which the correction information corresponding to one group are read.

* * * * *